(12) United States Patent
Frouin et al.

(10) Patent No.: US 6,880,097 B1
(45) Date of Patent: Apr. 12, 2005

(54) METHOD AND DEVICE FOR CHECKING THE SYNCHRONIZATION BETWEEN TWO NODES NI-1, NI IN A NETWORK

(75) Inventors: Laurent Frouin, Rennes (FR); Jean-Paul Accarie, Vern sur Seiche (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,549

(22) Filed: May 11, 2000

(30) Foreign Application Priority Data

May 11, 1999 (FR) .............................................. 99 06028

(51) Int. Cl.⁷ ................................................. G06F 1/12
(52) U.S. Cl. ........................ 713/400; 713/400; 713/500; 713/502; 713/503; 713/600; 370/241; 370/304; 370/324; 370/350; 370/503; 709/248; 709/400; 375/293; 375/354; 375/355; 375/356; 375/362
(58) Field of Search ................................. 713/400–401, 713/500, 502, 503, 600; 370/241, 304, 324, 350, 503; 709/248, 400; 375/293, 354–356, 362

(56) References Cited

U.S. PATENT DOCUMENTS

| | | | | |
|---|---|---|---|---|
| 3,560,869 A | * | 2/1971 | Miller ............................. 331/2 |
| 3,684,837 A | * | 8/1972 | Hartmann .................... 370/507 |
| 3,859,466 A | * | 1/1975 | Hartmann .................... 370/507 |
| 4,002,839 A | * | 1/1977 | Karl et al. ................... 370/507 |
| 4,042,781 A | * | 8/1977 | Dragotinov ................. 375/356 |
| 4,074,080 A | * | 2/1978 | Dragotinov et al. ........ 375/356 |
| 4,651,330 A | * | 3/1987 | Ballance ...................... 375/357 |
| 5,059,926 A | * | 10/1991 | Karczewski ................. 331/47 |
| 5,208,809 A | * | 5/1993 | Fergeson et al. ............ 370/545 |
| 5,475,717 A | * | 12/1995 | Cordonnier et al. ........ 375/356 |
| 5,544,324 A | * | 8/1996 | Edem et al. ................. 709/231 |
| 5,566,180 A | * | 10/1996 | Eidson et al. ............... 370/473 |
| 5,646,966 A | * | 7/1997 | Chaki et al. ................. 375/368 |
| 5,659,545 A | * | 8/1997 | Sowles et al. .............. 370/324 |
| 5,731,741 A | * | 3/1998 | Yamamoto et al. ........... 331/11 |
| 5,768,282 A | * | 6/1998 | Ohara et al. ................. 370/506 |
| 5,917,864 A | * | 6/1999 | Asahara ....................... 375/344 |
| 5,923,220 A | * | 7/1999 | Honma ......................... 331/17 |
| 6,081,571 A | * | 6/2000 | Jansson ....................... 375/376 |
| 6,157,646 A | * | 12/2000 | Nichols ................. 370/395.62 |

FOREIGN PATENT DOCUMENTS

| | | | | |
|---|---|---|---|---|
| JP | 401170241 A | * | 7/1989 | ........... H04L/11/00 |
| JP | 09-247135 | | 9/1997 | |

OTHER PUBLICATIONS

Ernst, W., "Digitalsignale Im Richtigen Takt Synchronisation Digitaler Kommunikationsnetze", Telcom Report, DE, Siemens AG. Munchen, vol. 12, No. 5, pp. 150–153, Sep. 1, 1989.

* cited by examiner

Primary Examiner—Lynne H. Browne
Assistant Examiner—Nitin Patel
(74) Attorney, Agent, or Firm—Fitzpatrick, Cella, Harper & Scinto

(57) ABSTRACT

The invention concerns a method of checking the synchronization between at least two nodes Ni−1, Ni, with i=1, . . . , n in a network, each of said nodes having respectively an internal clock having a respective clock frequency Fi−1, Fi, wherein said method includes the following steps:

a) transmitting the frequency Fi−1 of the internal clock from the node Ni−1 to the node Ni, b) comparing the frequency Fi−1 of the internal clock of the node Ni−1 transmitted to the node Ni with the frequency Fi of the internal clock of said node Ni, c) checking the synchronization between the nodes Ni−1 and Ni using the result of the comparison between the frequencies Fi−1 and Fi.

27 Claims, 12 Drawing Sheets

METHOD AND DEVICE FOR CHECKING THE SYNCHRONIZATION BETWEEN TWO NODES NI-1, NI IN A NETWORK

The present invention concerns a method of checking the synchronisation between at least two nodes Ni-1, Ni with i=1, . . . n in a network, each of said nodes having respectively an internal clock having a respective clock frequency Fi-1, Fi.

The present invention applies to any type of network and, for example, to packet switching networks.

A packet switching network generally has several switching nodes, some of which are connected together, forming the different branches of the network.

Each switching node has an internal clock with a given clock frequency, for example 24.576 MHz, and generates clock pulses at said given clock frequency.

It is possible for the clock frequencies of the internal clock peculiar to each switching node to be very different from each other. This is for example the case if the clock of a first node has a frequency of 24.576 MHz, that of a second node has a frequency of 50 MHz and that of a third node has a frequency of 60 MHz.

It is also possible for the clock frequencies of the internal clocks of all the switching nodes to be identical, in theory, to a single frequency, for example 24.576 MHz.

However, in practice, it is found that this value is obtained only to within a few ppm, notably for reasons of manufacturing tolerances on the same production line and, for reasons relating to the differences between production lines, from one clock manufacturer to another.

For example, the internal clock frequency peculiar to a switching node denoted A has a value of 24.576 MHz+100 ppm, whilst that of the internal clock peculiar to a node B has a value of 24.576 MHz−50 ppm.

In addition, all the switching nodes in a network have a characteristic which is peculiar to them, since it depends on the frequency of their internal clock, from which the duration of a "reference period" or "cycle" is defined.

The duration of the cycle denoted T is equal to an integer number $n_{init}$ of clock pulses common or not to all the nodes and which is multiplied by the inverse of the frequency of the internal clock peculiar to the node under consideration.

The duration of the cycle is thus for example 125 microseconds.

During this cycle the node under consideration exchanges data packets with other nodes.

The networks allow the transmission of packets synchronised using the cycles of the nodes under consideration and are for example used for switching real-time data packets of the audio/video type.

By way of example, a video data packet which is in the DV ("digital video" format) is transmitted by a switching node in a network every 125 microseconds, which corresponds to the duration of the cycle of said node.

Thus, when the two switching nodes mentioned previously are taken, denoted A and B, with their respective clock frequency values, namely 24.576 MHz+100 ppm and 24.576 MHz−50 ppm, the durations of the cycles calculated for each of said nodes, denoted respectively TA and TB, are different because of the different frequencies of the internal clocks peculiar to these nodes.

FIG. 1 also illustrates this phenomenon and shows, on two superimposed axes, for two integer numbers $n_{initA}$ and $n_{initB}$ such that $T_A = n_{init}/F_A$ and $T_B = n_{init}/F_B$, where F designates the clock frequency of the node under consideration, a cycle peculiar to the node B and of duration $T_B$ greater than the duration $T_A$ of a cycle peculiar to the node A.

It should be noted that the case depicted in FIG. 1 is very improbable in reality since it envisages a zero phase shift at the origin of each of the first cycles of the two nodes.

However, a comparison of these two axes reveals a relative deviation in the beginning of each cycle which corresponds in fact to a change in the phase shift during the time between the cycles under consideration.

This figure depicts, above the first two cycles of the node under consideration, the numbers 1 and 2 identifying two data packets.

In addition, two arrows have been depicted between the two axes in order to indicate the delay with which the data packets denoted 1 and 2 are transmitted from the node A to the node B after having passed over the link connecting said nodes A and B together.

Thus, having regard to the relative time deviation found between the respective cycles of the nodes A and B, at the end of a certain number of cycles, a data packet coming from the node A will not be transmitted to the node B.

The non-transmission of this data packet may therefore be highly prejudicial for real-time data of audio and/or video type.

This is because, with data for example of the video type, it is very important to correctly transmit all the video data packets in order not to degrade the video image obtained from the transmitted packets.

In general terms, if it is found that the duration $T_A$ is less than $T_B$, this means that one cycle would have been lost at the end of a certain number of cycles and one data packet will therefore be lost.

If, on the other hand, $T_A$ is greater than $T_B$, then there will therefore be a cycle empty of any meaning at the end of a certain number of cycles and no data packet will be transmitted during one of the cycles, giving rise, thereby, to a loss of synchronisation in the processing of the real-time data of the audio and/or video type.

The present invention thus aims to remedy this drawback by proposing a method of checking the synchronisation between at least two nodes ni-1, Ni, with i=1, . . . , n in a network, each of said nodes having respectively an internal clock having a respective clock frequency Fi-1, Fi, wherein said method includes the following steps:

a) transmitting the frequency Fi-1 of the internal clock from the node Ni-1 to the node Ni, b) comparing the frequency Fi-1 of the internal clock of the node Ni-1 transmitted to the node Ni with the frequency Fi of the internal clock of said node Ni c) checking the synchronisation between the nodes Ni-1 and Ni using the result of the comparison between the frequencies Fi-1 and Fi.

Correlatively, the invention relates to a device for checking the synchronisation between at least two nodes Ni-1, Ni, with i=1, . . . , n in a network, each of said nodes having respectively an internal clock having a respective clock frequency Fi-1, Fi, wherein said device has:

d) means of transmitting the frequency Fi-1 of the internal clock from the node Ni-1 to the node Ni, e) means of comparing the frequency Fi-1 of the internal clock of the node Ni-1 transmitted to the node Ni with the frequency Fi of the internal clock of said node Ni, f) means of checking the synchronisation between the nodes Ni-1 and Ni using the result of the comparison between the frequencies Fi-1 and Fi.

Advantageously, the invention makes it possible to take into account a deviation in frequency due to the clock of the node Ni.

Checking the synchronisation means:
a local action, either immediate (on the current measurement) or deferred (on the next measurement), on the duration Ti,
a possible propagation (command) of this action to the lower-level nodes (Ni+i, . . . ).

It should be noted that checking the synchronisation can also consist of noting that no deviation is detected between the nodes Ni−1 and Ni and therefore that no action is envisaged.

The result of the comparison between the frequencies Fi−1 and Fi makes it possible to detect any relative deviations between the cycles of said nodes and thus to check the synchronisation between the internal clocks peculiar to the nodes Ni−1 and Ni of the network and, in more general terms, between these nodes.

Such deviations may, in fact, be responsible for the non-transmission of data packets.

According to a second aspect, the invention relates to a method of checking the synchronisation between several nodes Ni−1, Ni, Ni+1 in a network, with i=1, . . . , n, each of said nodes Ni−1, Ni, Ni+1 having respectively an internal clock having a respective clock frequency Fi−1, Fi, Fi+1, and defining successive time cycles each having a duration Ti−1, Ti, Ti+1 peculiar to said clock under consideration, wherein said method includes a step of the reception, by the node Ni+1, of a command coming from the node Ni and indicating to said node Ni+1 that the duration Ti of the cycle of said node Ni has been modified following the result of the comparison of the frequency Fi−1 of the internal clock of the node Ni−1 transmitted to the node Ni with the frequency Fi of the internal clock of said node Ni.

Correlatively, the invention relates to a device for checking the synchronisation between several nodes Ni−1, Ni, Ni+1 in a network, with i=1 . . . , n, each of said nodes Ni−1, Ni, Ni+1 having respectively an internal clock having a respective clock frequency Fi−1, Fi, Fi+1, and defining successive time cycles each having a duration Ti−1, Ti, Ti+1 peculiar to said clock under consideration, wherein said device has means for the reception, by the node Ni+1, of a command coming from the node Ni and indicating to said node Ni+1 that the duration Ti of the cycle of said node Ni has been modified following the result of the comparison of the frequency Fi−1 of the internal clock of the node Ni−1 transmitted to the node Ni with the frequency Fi of the internal clock of said node Ni.

Advantageously, the invention makes it possible to propagate any modification of the duration of the cycle of the node of level i−1 (the level-zero node being the root, that is to say the reference node for all the other nodes in the network.

According to one characteristic, the method includes an initialisation step during which one of the two respective numbers of clock pulses of $n_{init(i-1)}$ and $n_{init(i)}$ of the internal clocks of the nodes Ni−1 and Ni is adapted as a function, on the one hand, of the other number and, on the other hand, of the duration of the cycle attached to this other number, so that the cycle durations Ti−1 and Ti are equal to each other.

Advantageously, this characteristic makes it possible to calibrate the different values Cinit of the different nodes of the network with respect to the root node, so that the durations T0 and Ti with i=1 are approximately equal.

According to a third aspect, the invention also relates to a method of adjusting a predetermined period in a network comprising a first node and a second node, the predetermining period being a period used as a cycle for transferring information in a serial bus connected to the network, the method, executed by the second node, comprising the following steps of:

obtaining time information representing times in the fist node and in the second node during a predetermined period;

comparing obtained information; and modifying the predetermined period according to the result of said comparing step.

Correlatively, the invention relates to a device for adjusting a predetermined period in a network comprising first and second nodes one of which includes the device, the predetermined period being a period used as a cycle for transferring information in a serial bus connected to the network, the device comprising:

means for obtaining time information representing times in the first node and in the second node during a predetermined period:

means for comparing obtained information; and means for modifying the predetermined period according to the result of the comparison.

According to a fourth aspect, the invention relates to a data processing apparatus, wherein it has a device for checking the synchronisation or a device for adjusting a predetermined period in a network in accordance with the brief disclosure above.

According to a fifth aspect, the invention relates to a communication network, wherein said network has a synchronisation checking device or a device for adjusting a predetermined period in a network in accordance with the brief disclosure above.

According to a sixth aspect, the invention relates to a communication network, wherein said network has a data processing apparatus as briefly disclosed above.

The invention also relates to an information storage means, possibly totally or partially removable, which can be read by a computer or a processor containing instructions of a computer program, wherein it makes it possible to implement the method of checking the synchronisation in a network or the method of adjusting a predetermined period in a network as briefly disclosed above.

The invention also relates to an information storage means which can be read by a computer or a processor containing data coming from the implementation of the method of checking the synchronisation communication network or the method of adjusting a predetermined period in a network as briefly disclosed above.

The invention also relates to an interface for receiving instructions of a computer program, wherein it makes it possible to implement the method of checking the synchronisation in a network or the method of adjusting a predetermined period in a network as briefly disclosed above.

The invention further relates to a computer program product loadable into a programmable device, comprising software code portions for performing the steps of the method of checking the synchronisation communication network or the method of adjusting a predetermined period in a network, when said product is run on a programmable device.

Since the advantages and characteristics peculiar to the device for checking the synchronisation in a communication network, to the device for adjusting a predetermined period in a network, to the data processing apparatus including such a device, to said network including such a data processing apparatus, to the information storage means, to the interface and to the computer program product, are the same as those disclosed above concerning the method of checking the synchronisation in a communication network according to the invention, they will not be repeated here.

Other characteristics and advantages will emerge during the following description given by way of illustrative and non-limitative example, and made with reference to the accompanying drawings, in which:

FIG. 5a is an algorithm of the initialisation of the synchronisation checking method according to the invention which is stored in the permanent storage means 14 of FIG. 3a;

Figure 6:
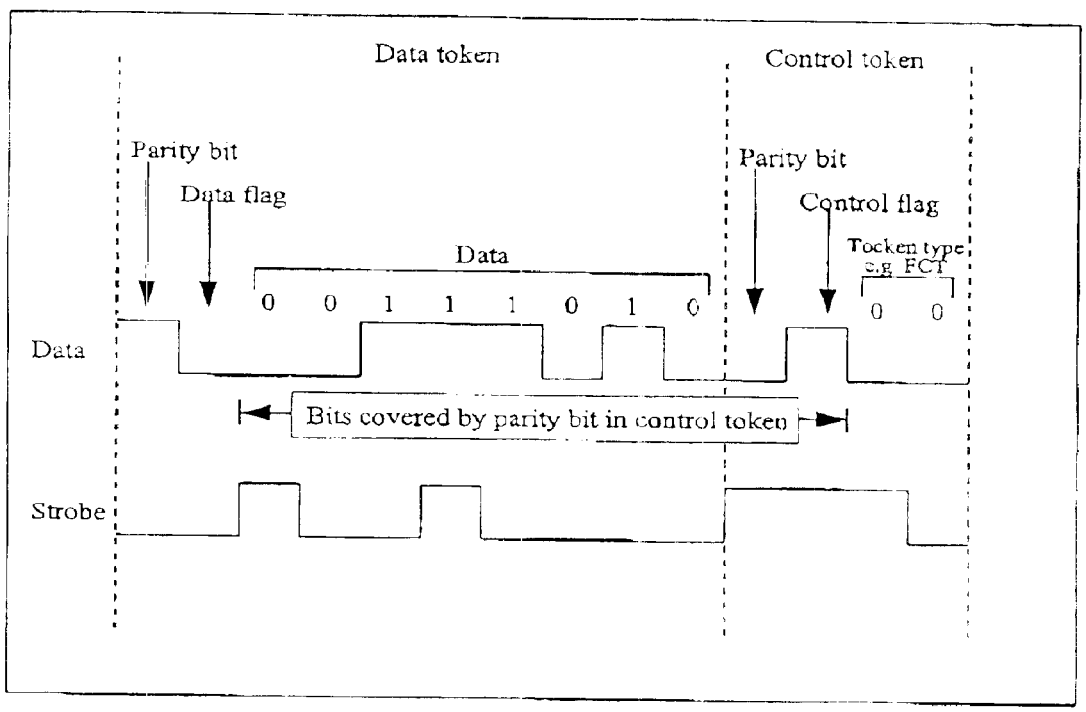
Figure 7:
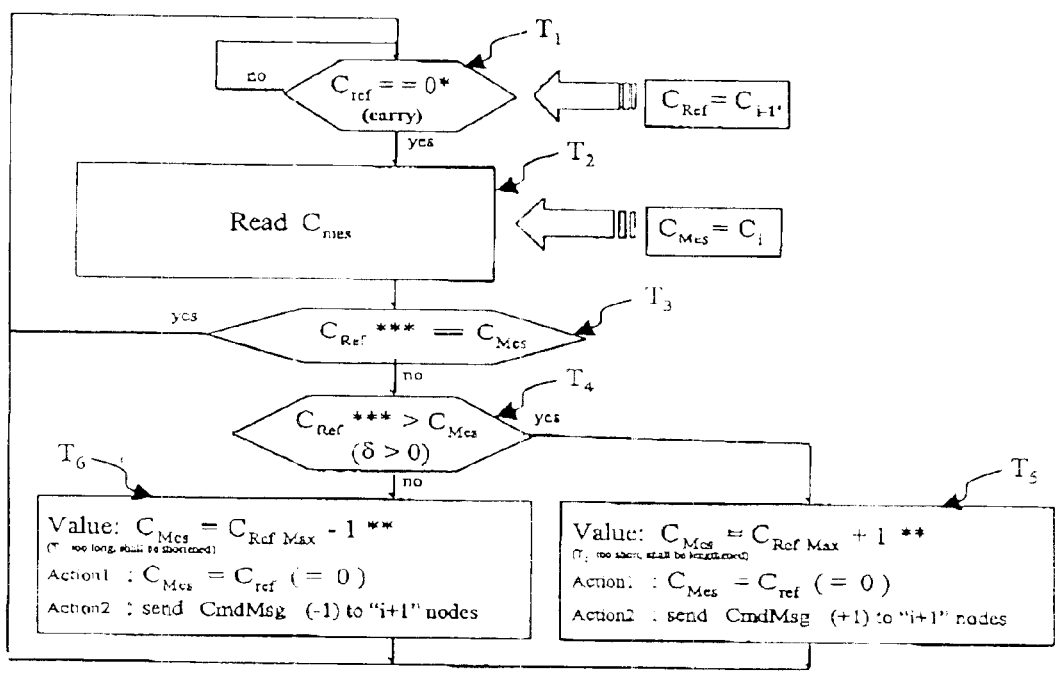
Figure 8:
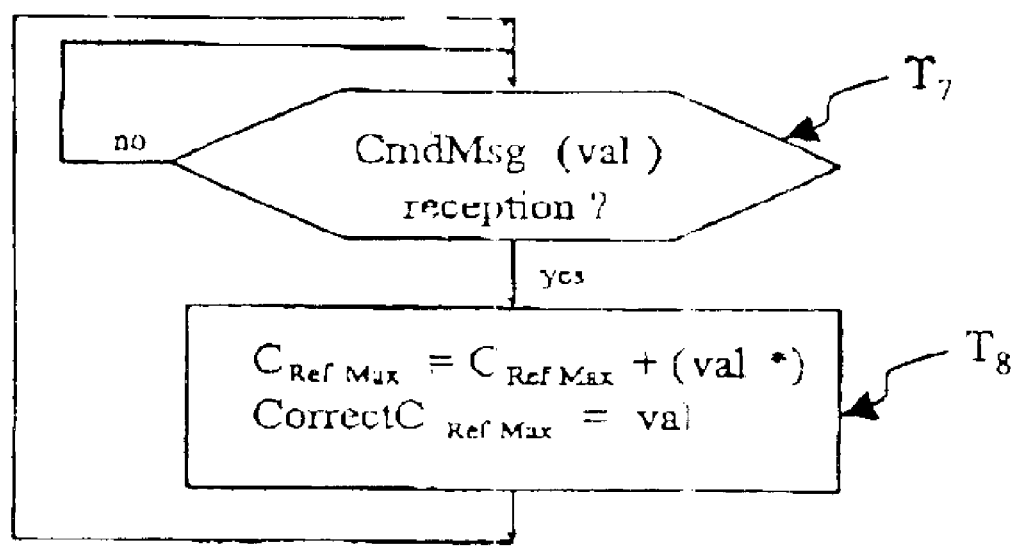
Figure 9:
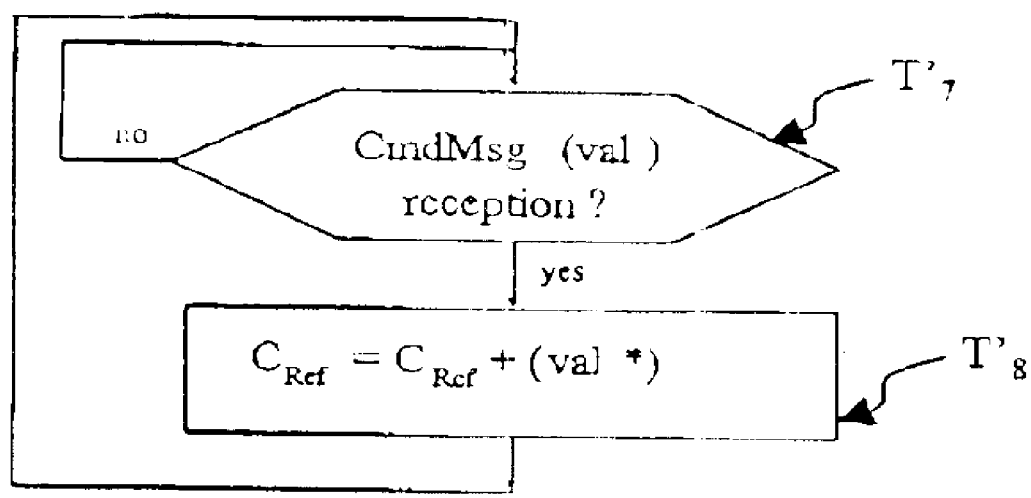
Figure 10:
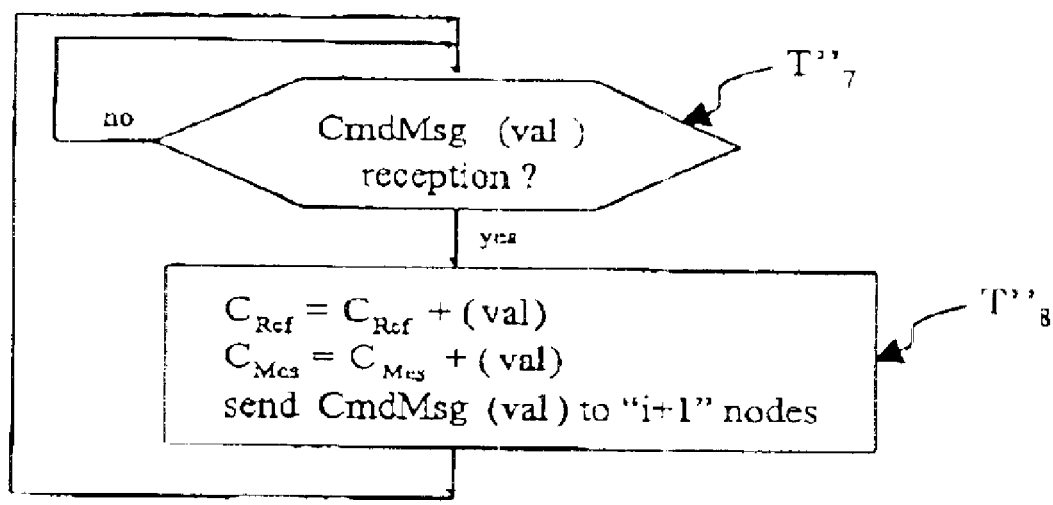

FIG. 6 indicates the appearance of "data strobe" signals;

FIG. 7 is an algorithm for the synchronisation checking method according to the invention, implemented at the node Ni;

FIG. 8 is an algorithm for the synchronisation checking method according to the invention, implemented at the node Ni+1;

FIG. 9 is a first variant embodiment of the algorithm depicted in FIG. 8;

FIG. 10 is a second variant embodiment of the algorithm depicted in FIG. 8.

Figure 1:
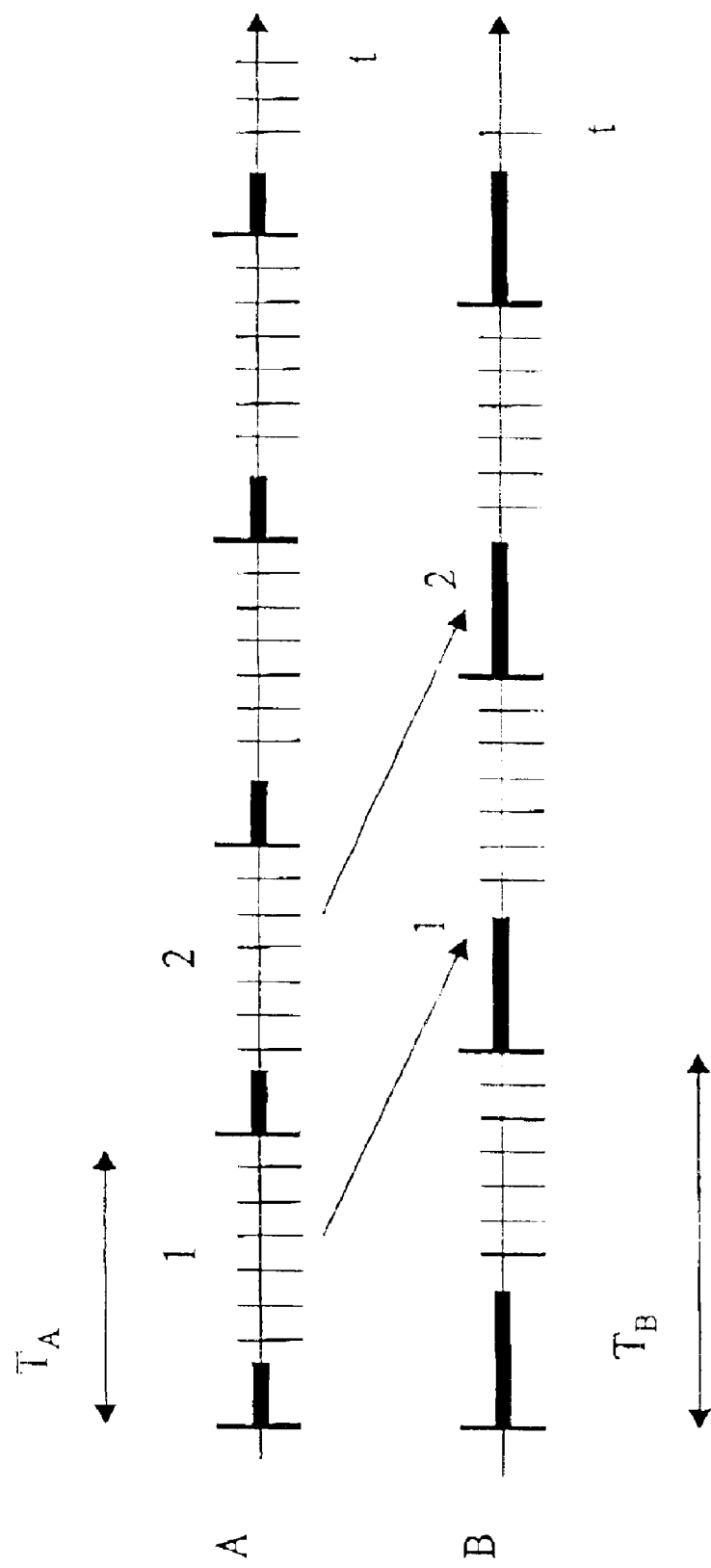
FIG. 1 is a schematic view illustrating the phenomenon of the deviation between the durations of the cycles of the internal clocks of the "cycle masters" of two serial communication buses connected by a bridge.
Figure 2:
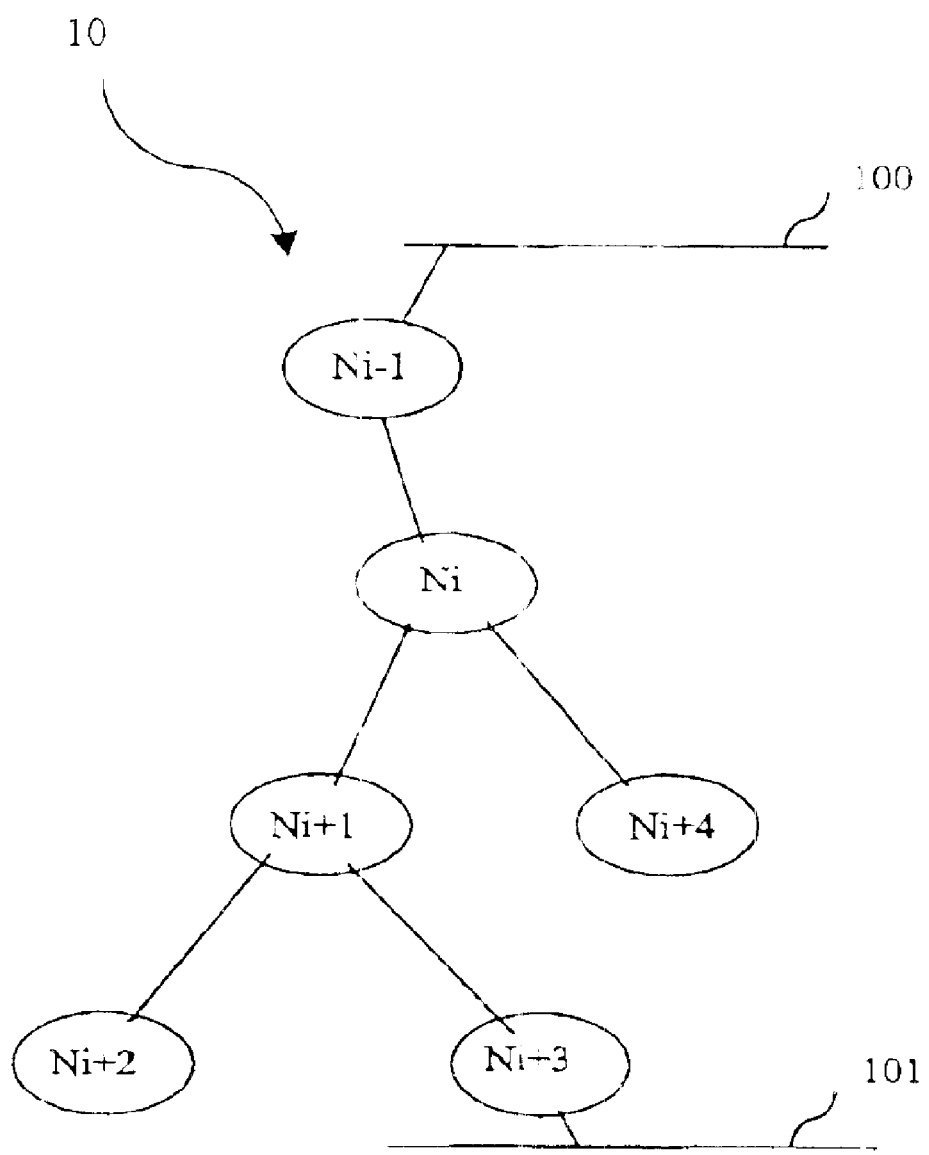
FIG. 2 is a schematic view of a network of communication nodes according to the invention.

As depicted in FIG. 2 and designated by the general reference denoted 10, a network for switching data packets according to the invention has several communication nodes connected together by physical links which can take different forms: cable, radio, optical etc.

The network is, for example, in accordance with IEEE 1355.

A particular node in the network is designated as being the upper node, referred to as the 'root' node, from which the various other communication nodes extend, constituting the branches of a hierarchical tree structure as far as the nodes constituting the ends of the branches, which will refer to as 'leaves'.

FIG. 2 is a virtual view of the network.

The communication nodes are marked by the letters Ni−1 to Ni+4 in FIG. 3, the node Ni−1 being the root node and the nodes Ni+2, Ni+3 and Ni+4 being the leaf nodes.

Each node in the network is indicated by the orders i−1, i, i+1, i+2 in order to explain the synchronisation checking method according to the invention which is effected by pairs of nodes.

Each communication node in this network represents, for example, a data processing apparatus.

The data processing apparatus are for example chosen amongst the following peripherals: printers, computers, servers, scanners, video tape recorders, decoders (or set top boxes), television receivers, telephones, digital cameras, camcorders, digital photographic apparatus, audio/video players, loudspeakers etc.

As depicted in FIG. 2, nodes Ni−1 and Ni+3 are each connected to a 1394 serial bus, respectively noted 100 and 101, such serial buses enabling isochronous packet transfer.

Each node has an internal clock, not shown in FIG. 3, from which so-called clock pulses are generated at a so called clock frequency, for example 24.576 MHz.

Each internal clock defines successive time cycles each having a duration T peculiar to said clock under consideration.

The duration T of the cycle of a node is determined by the number $n_{init}$ of clock pulses generated by the internal clock of said node during this period according to the equation $T=n_{init}/F$.

The notation $C_{init}$ will be used instead of $n_{init}$ in the figures, and the notation $C_{mes}$ and $C_{ref}$ instead of respectively $n_{mes}$ and $n_{ref}$.

Thus 3072 clock pulses are for example counted in a reference cycle or period with a duration of 125 is for a clock frequency of 24.576 MHz.

This 125 μs corresponds to the cycle time of the 1394 serial bus (i.e., cycle time required for transferring an isochronous packet).

For example, nodes Ni−1 and Ni+3 of the FIG. 2 are connected to such 1394 serial buses.

Within the IEEE 1394 standard, isochronous services can be provided by giving the highest priority to access the bus to a specific peripheral called "cycle master" that maintains a common clock source. This cycle master tries to transmit a special timing request called "cycle start" at specific intervals set by a "cycle synch" source.

Each node having isochronous service has a 32-bit cycle time register.

The low order 12 bits of the register are a modulo 3072 count, which are incremented each 24.576 MHz clock period.

Figure 3A:
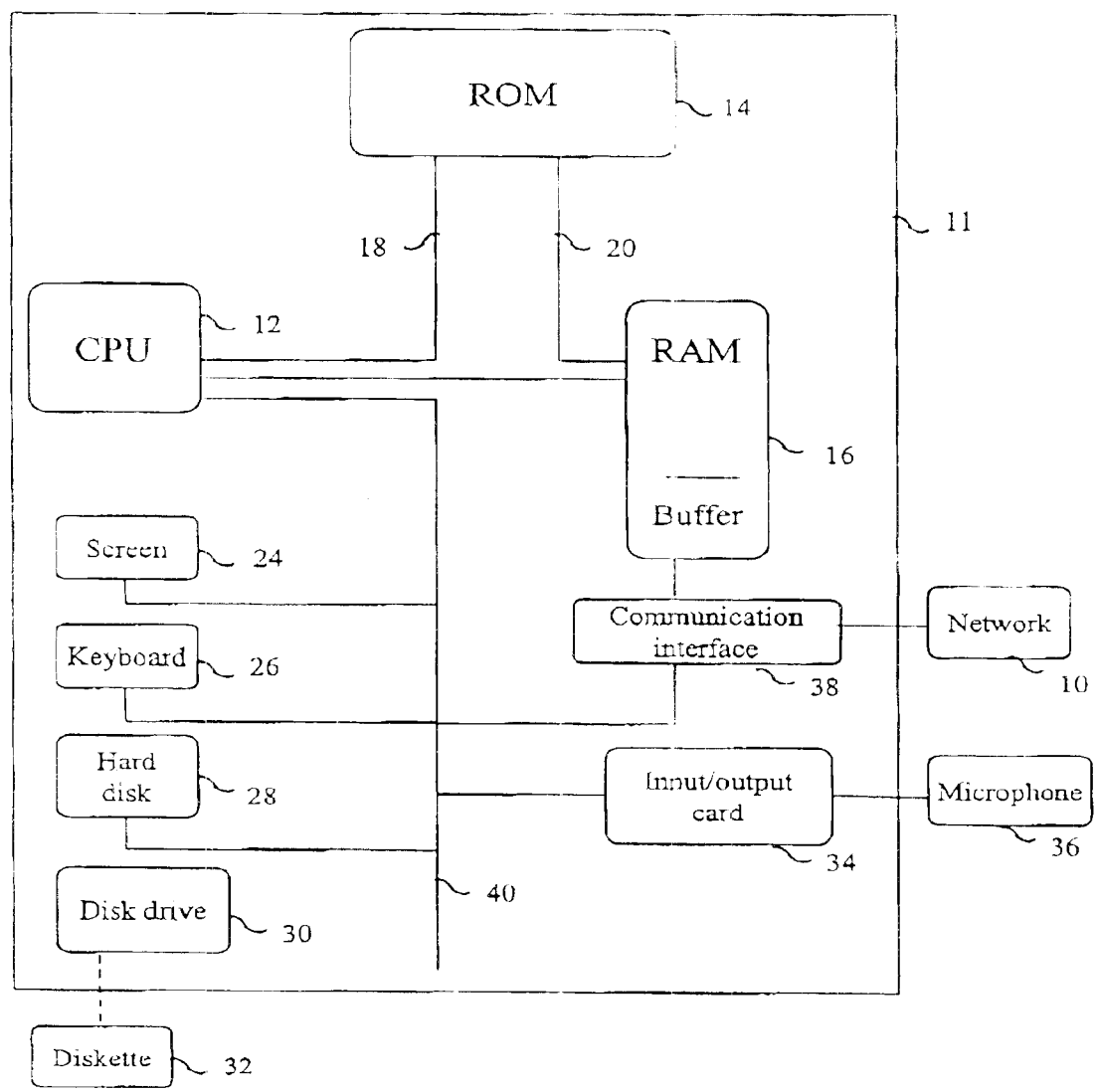
FIGS. 3a and 3b are schematic views depicting respectively the nodes Ni−1 and Ni in the network of FIG. 2.

FIG. 3a depicts the schematic structure of a data processing apparatus such as a computer 11 including the node Ni−1. All the nodes in the network depicted in FIG. 2 have for example this structure, and FIG. 3b also illustrates the schematic structure of another data processing apparatus such as a computer including the node Ni.

The data processing apparatus could also take the form of a printer, a server, a facsimile machine, a scanner, a video tape recorder, a set-top box, a television receiver, a telephone, a camcorder, a digital camera, a digital photographic apparatus, an audio/video player or a loudspeaker.

Figure 3B:
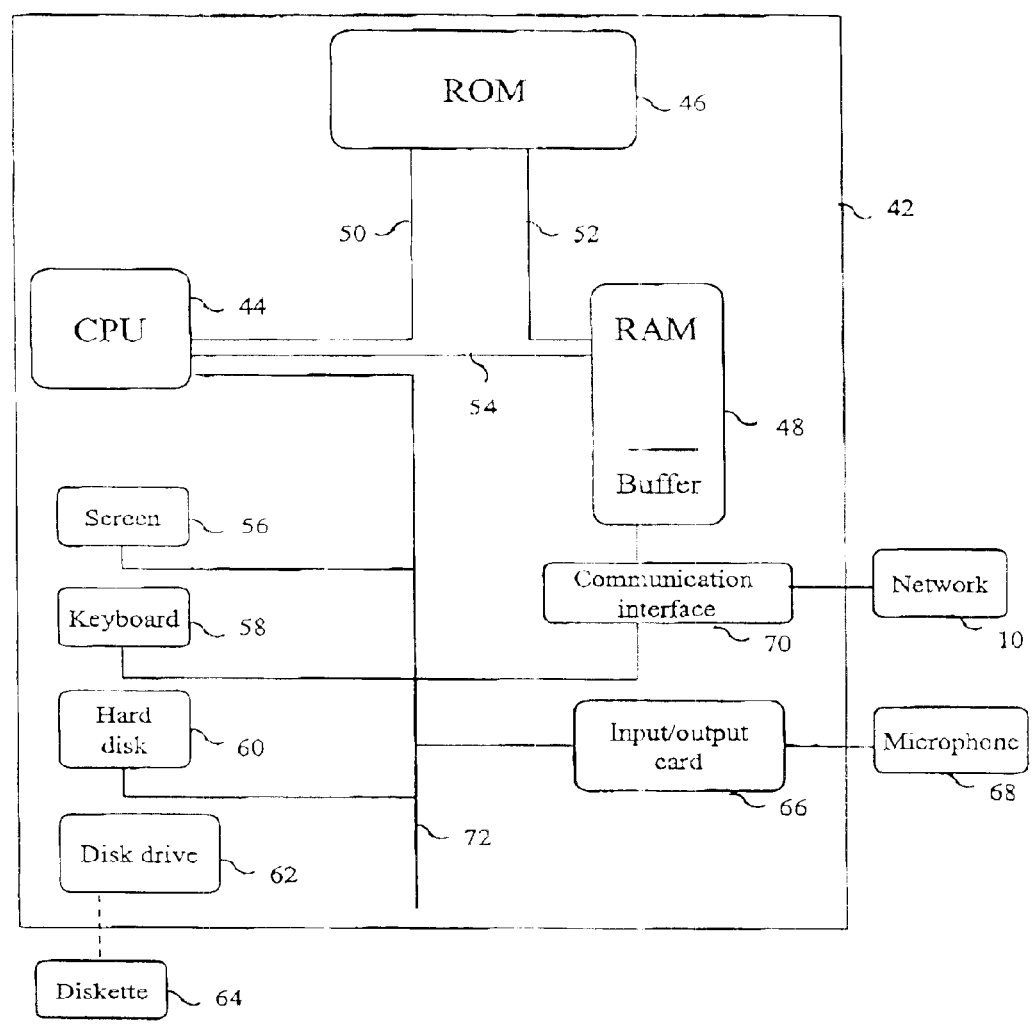

All the nodes in FIG. 2 and FIGS. 3a and 3b can for example be integrated into a data processing apparatus of this type or constitute the apparatus itself.

The node Ni−1 has a calculation unit CPU 12, a permanent storage means 14 (ROM) which contains notably the different instructions of the algorithm depicted in FIGS. 5a and 5b and a temporary storage means 16 (RAM) which contains several registers named "$C_{refinit}$", "$C_{ref}$", "$C_{mes}$", '$C_{refmax}$' and "CorrectC$_{refmax}$", whose function will be described subsequently.

It should be noted that, in the figures, the value $C_{refinit}$ corresponds to the value $C_{init}$.

Figure 4:
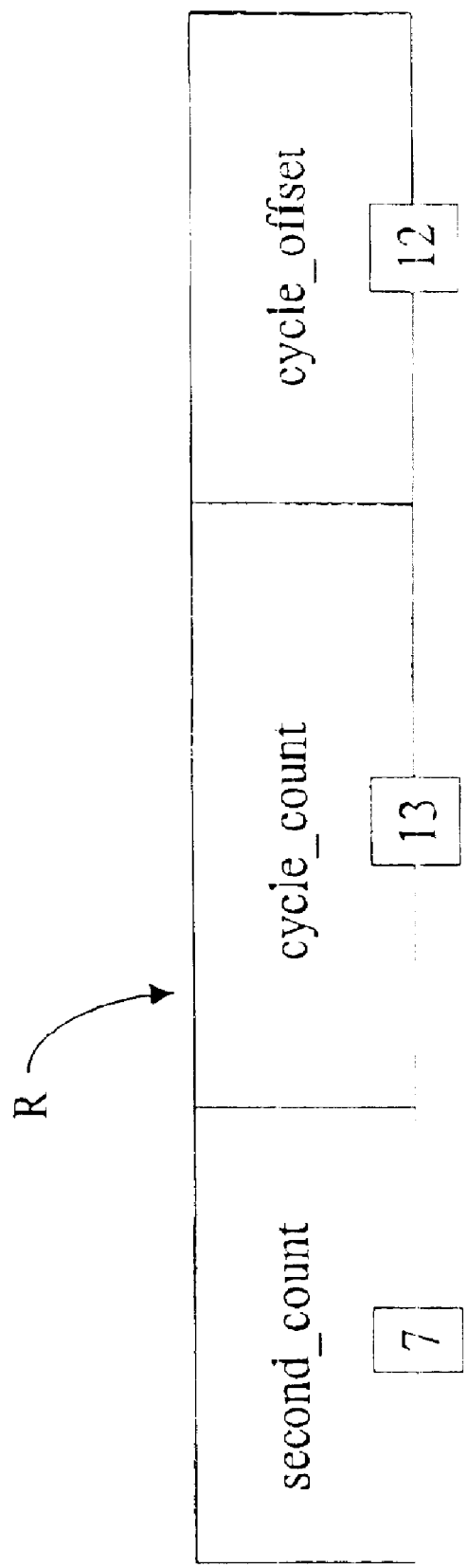
FIG. 4 depicts the schematic structure of a register R used in the storage means of the nodes according to the invention.

These registers have for example the structure of the register R which is depicted in FIG. 4.

Such a register has several areas, notably a first area depicted in the right-hand part of the figure and which is called "cycleoffset". In this first area, which includes 12 bits, there is recorded the number of clock pulses $n_{init}$ contain within a cycle peculiar to the communication node under consideration.

In accordance with that which was mentioned previously, up to 3071 clock pulses are counted in this first area. At each pulse of the clock under consideration, the value of this first area of the register is incremented. When the value 3071 is reached and a new clock pulse is counted, the value of the register contained in this first area will pass to 0 and a carry will then increment the value of the second area of the register which is situated at the centre of FIG. 4 and is called "cycle count". This second area totals the number of cycles elapsed, up to a number 7999, and is recorded in 13 bits. This second area is incremented each time a carry is generated from the first "cycle-offset" area.

However, an incrementation by one unit from the value 7999 in this second area of the register R will cause a return to 0 of the value of this area of the register, thus generating a carry which will increment a third area of the register R, situated to the left of FIG. 4 and called "second count".

The third area "second count" is recorded in 7 bits. This third area counts the number of times the second area "cycle count" overflows, up to a value of 127. An incrementation by one unit for the value 127 in this third area of the register R then causes a return to 0 of the value recorded in this area.

Returning to FIG. 3a, the aforementioned three elements 12, 14 and 16 communicate by means of respective address and data buses denoted 18, 20, 22.

The computer 11 also has a screen 24, a keyboard 26, a hard disk 28, a disk drive 30 able to receive a diskette 32, an input/output card 34 connected to a microphone 36 and a communication interface 38 enabling said computer to be connected to the network 10.

The network interface 38 can receive, for example, by means of the network the instructions of a computer program for implementing all or part of the method according to the invention.

Such instructions can also be contained in the disk drive in a CD-ROM player, not shown. Another address and data bus 40 connects the calculation unit 12 to the elements which have just been described.

Moreover, as indicated previously, the computer 42 of FIG. 3b has the same structure as that of the computer 11 of FIG. 3a.

Thus the computer 42 has a calculation unit CPU 44, a permanent storage means 46 (ROM) which contains notably the different instructions of the algorithms depicted in FIGS. 5a, 5b and 7 to 10, and a temporary storage means 48 (RAM) which contains several registers called "$C_{refinit}$", "$C_{ref}$", "$C_{mes}$", "$C_{refmax}$ R" and "Correct$C_{refmax}$", whose function will be described subsequently.

The aforementioned three elements 44, 46 and 48 communicate by means of respective address and data buses denoted 50, 52 and 54.

The computer 42 also has a screen 56, a keyboard 58, a hard disk 60, a disk drive 62 able to receive a diskette 64, an input/output card 66 connected to a microphone 68 and a communication interface 70 enabling said computer to be connected to the network 10.

The network interface 70 can receive, for example, by means of the network, the instructions of a computer program enabling all or part of the method according to the invention to be implemented.

Such instructions can also be contained in the disk drive in a CD-ROM player, not shown.

Another address and data bus 72 connects the calculation unit 44 to the elements which have just been described.

The description of the method of checking the synchronisation between the nodes Ni−1 and Ni according to one embodiment of the invention will now be dealt with.

In this embodiment of the invention, it is considered that the "root" node Ni−1 constitutes a reference for the node Ni.

It should however be noted that the following description is in no way limited to this embodiment and that the implementation of another embodiment in which the node Ni constitutes a reference for the node Ni−1 is within the capability of a person skilled in the art.

The registers called "$C_{REFINIT}$", "$C_{REF}$", "$C_{MES}$", "$C_{REFMAX}$" and "Correct$C_{REFMAX}$" contain values counted by number of clock pulses. In the remainder of the disclosure, the following notations will be used:

The register containing the number of reference clock pulses will be denoted $C_{REF}$ whilst "$C_{REF}$" designates the register containing this value. In the chosen embodiment the value $C_{REF}$ is equal to the value $C_{i-1}$ which designates the number of clock pulses of the node Ni−1.

$C_{MES}$ designates the number of measurement clock pulses contained in the register "$C_{MES}$". The value $C_{MES}$ is equal to the value $C_i$ which designates the number of clock pulses of the node N, in the embodiment described.

The value $C_{REFMAX}$ contained in the register "$C_{REFMAX}$" represents the maximum value which forces the register "$C_{REF}$" to return to the value 0.

The value $C_{INIT\ (i)}$ represents the initialisation value which is calculated as a function of the value $C_{i-1}$ and the different clock frequencies $F_i$ and $F_{i-1}$ of the respective internal clocks of the nodes Ni and Ni−1.

The value $C_{INIT\ (i-1)}$ is stored in the register "$C_{refinit}$". It should be noted that this value corresponds to the deviation between the clocks of the nodes Ni and Ni−1 at the start.

The value Correct$C_{REFMAX}$ stored in the register "Correct$C_{REFMAX}$" is used in order to know whether a correction (synchronisation step) is under way at a node.

The value NB_ITER_INIT represents the number of iterations used in order to obtain a mean of the value $C_{INIT(i)}$.

This number can be chosen as a function of the position (or depth in the spanning tree of the node in the tree which constitutes the communication network 10 according to the invention.

The variable nb (i) is a value characteristic of the node Ni and varied according to the position of this node in the tree.

The value NB_ITER_INIT is a local variable which is initialised with the variable nb (i).

The value of nb (i) is chosen so as to be equal to "2 i+1" with i=0, . . . , N.

The value $C_{TOT\ INIT}$ represents the mean effected on the values $C_{MES}$.

CmdInitMsg($C_{INIT}(i)$) corresponds to a command sent to the lower nodes in the tree formed by the network in order to communicate to them the value $C_{INIT(i)}$ (the initialisation value of the registers of the nodes under consideration) and to permit the initiation of the initialisation procedure at these nodes.

Figure 5A:
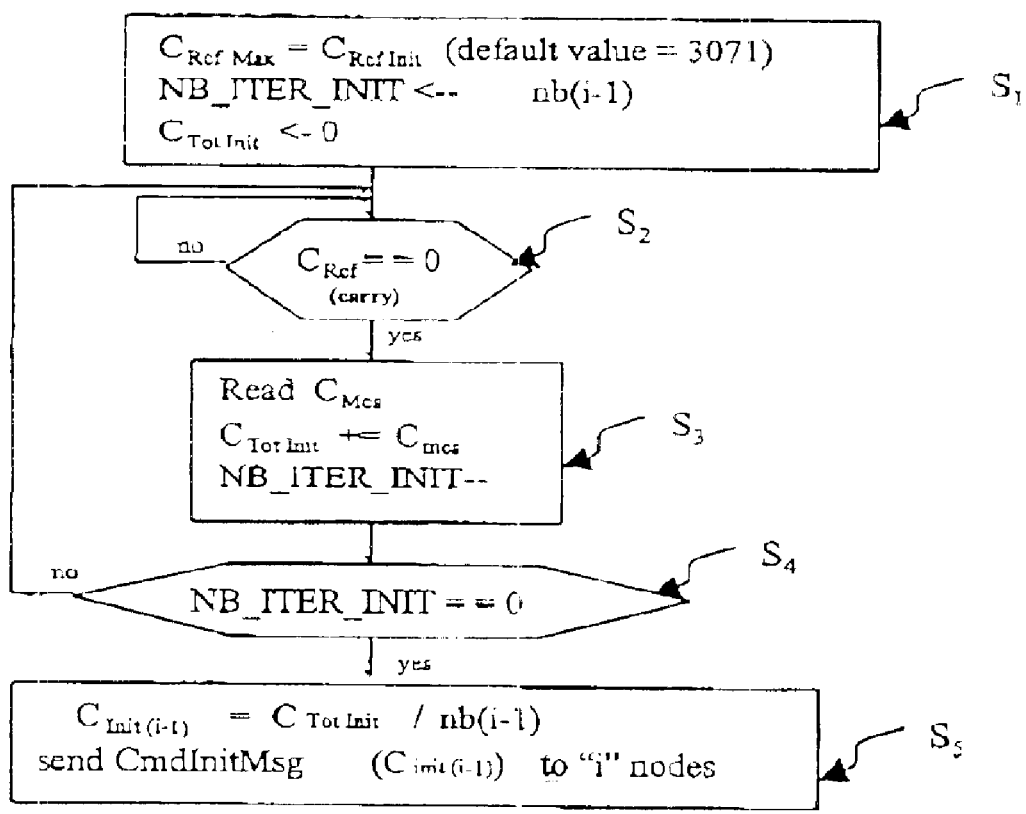

FIG. 5a depicts an initialisation phase implemented at the node Ni−1 (the root node), and in each of the other nodes in the network.

The first step $S_i$ of this initialisation phase consists of setting the value $C_{REFMAX}$ to a value fixed by default, $C_{REF\ INIT}$. This value is for example equal to 3071 clock pulses.

During this same set the value NB_ITER_INIT is fixed at a value less than nb(i−1), thus making it possible to effect the averaging of the value $C_{init}$ as a function of the position of the node in the tree.

Still according to this same step, the value $C_{TOT\ INIT}$ is fixed at zero.

The following step $S_2$ consists of performing a test on the value of $C_{REF}$ with respect to the value zero.

For example, the value $C_{ref}$ is incremented at the clock frequency transmitted to the node under consideration and the value $C_{mes}$ is incremented to the frequency of the clock of the node under consideration.

As long as this value is not equal to zero, then this step is renewed and the duration of all the steps $S_2$ put end to end constitutes a measuring period.

On the other hand, when the number of clock pulses emitted by the internal clock of the node Ni–1 changes from 3071 to the value 0, then the step $S_2$ is followed by the step $S_3$, during which the value $C_{MES}$ is read.

This value corresponds to the number of clock pulses emitted by the internal clock of the node Ni–1.

Step $S_3$ also consists of adding the value $C_{MES}$ to the values previously added together and the value which results therefrom is denoted $C_{TOT\_INIT}$. The number NB_ITER_INIT is then decremented by one unit at each loop.

The following step $S_4$ consists of performing a test on the value NB_ITER_INIT with respect to the value zero. When this number is not equal to zero then the initialisation phase makes provision for repositioning itself at step $S_2$.

On the other hand, when this number is equal to zero, thus signifying that nb(i–1) loops have been effected, then the step $S_4$ is followed by step $S_5$ during which an initialisation value denoted $C_{INIT(i-1)}$ is determined which is equal to the ratio of the value $C_{TOT\_INIT}$ to the variable nb(i–1).

An averaging is as it were effected on a measurement number nb(i–1).

The step $S_5$ also makes provision for sending a command CmdInitMsg($C_{INIT(i-1)}$) to the node i of FIG. 2, which will thereby make it possible to trigger this same initialisation algorithm at all the lower nodes of the network.

Figure 5B:
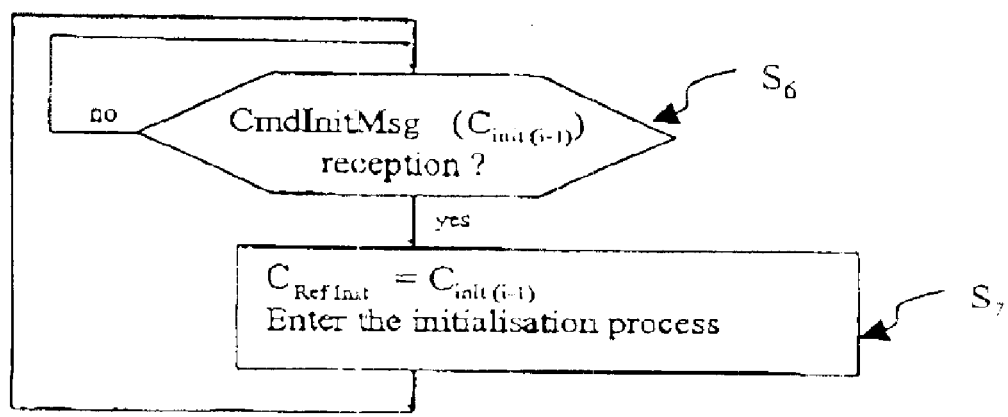
FIG. 5b is an algorithm for initiating the initialisation procedure depicted in FIG. 5a and which is stored in the permanent storage means 46 of FIG. 3b.

FIG. 5b also illustrates an initialisation algorithm implemented, just like the algorithm of FIG. 5a, through the execution of a computer program contained in the permanent storage means of the node under consideration, that is to say, in the present case, in the ROM memory denoted 46 in FIG. 3b.

The algorithm of FIG. 5b includes a step denoted $S_6$, during which a test is carried out in order to determine whether a command CmdInitMsg($C_{INIT(i-1)}$) has been received at the node Ni.

In the negative, the node awaits reception of such a command.

In the affirmative, step $S_6$ is followed by a step $S_7$ during which the value $C_{ref\_init}$ of the node Ni is fixed at the value received from the node Ni–1, namely $C_{(INIT(i-1))}$.

Step $S_7$ is then followed by steps $S_1$ to $S_5$, previously commented on, except that the indices (i–1) are changed to indices (i).

In the remainder of the disclosure it will be seen how this transmission of the number of clock pulses is effected from the node Ni–1 to the node Ni.

In a similar fashion, when the step $S_5$ effected at the node Ni has been performed, the result is an initialisation value $C_{init(i)}$, which is transmitted to the node Ni+1 and Ni+4 of FIG. 2.

It should be noted that the transmission of the pulses generated by the internal clock of the node Ni–1 to the node Ni corresponds to a transmission of the frequency Fi–1 of the internal clock from the node Ni–1 to the node Ni.

In the embodiment described here, the step of transmitting the clock frequency Fi–1 from the node Ni–1 to the node Ni consists of a step of reconstituting the pulses generated by the internal clock of the node Ni–1 and which are transmitted with data packets to the node Ni.

Thus, during this initialisation procedure, the numbers of dock pulses at the different nodes are adapted according to the number of clock pulses of a reference node, as well as to the duration of the cycle attached to this number of references so that the durations of the cycles of the different nodes of the network are equal to each other.

FIG. 6 shows the appearance of the data signals known by the term "Data Strobe" ("Strobe" meaning "stroboscope").

The principle illustrated in FIG. 6 consisting of generating, at each clock pulse, a transition on the signal "Strobe" when there is not one on the signal "Data" so that, on reception of such signals, the clock signal of the transmitting node can be reconstituted.

FIG. 7 represents an algorithm of the synchronisation checking method according to the invention which is implemented through the execution of a computer program contained in the permanent storage means 46 of FIG. 3b.

All the nodes in the network 10 depicted in FIG. 2 have for example a computer program contained in their permanent storage means which is based on such an algorithm.

On the right hand part of FIG. 7 the values $C_{ref}$ and $C_{mes}$ are depicted, which are used in the implementation of this algorithm.

The value $C_{ref}$ corresponds to the number of clock pulses generated by the internal clock of the node Ni–1 and which are regenerated at the node Ni as indicated above with reference to FIG. 6.

This number of clock pulses is denoted in this figure $C_{(i-1)}$ and corresponds in fact to the value $C_{init(i-1)}$, the initialisation value calculated at the node Ni–1.

The value $C_{mes}$ is equal to the number of clock pulses generated by the local clock of the node Ni during the so-called reference period, during which the value $C_{ref}$ changes from the value zero to the value $C_{refmax}$.

The method according to the invention makes provision for waiting for a period Ti–1 of the cycle of the node Ni–1 so that the number of clock pulses contained in the register "$C_{ref}$" reaches the value $C_{refmax}$ and forces the register "$C_{ref}$" to return to zero.

The method according to the invention includes a test step $T_1$ during which the value $C_{ref}$ is compared with zero.

Thus, when the reference period $T_{i-i}$ has elapsed and the value $C_{ref}$ has passed to zero, then the step $T_1$ is followed by a step $T_2$ during which the value $C_{mes}$ of the node Ni is read.

These two steps consist finally of determining the number of clock pulses generated by the internal clock of the node Ni during the reference period Ti–1 of the node Ni–1.

As depicted in FIG. 7, the method according to the invention also includes a step $T_3$, during which the value $C_{refmax}$ is compared with the value $C_{mes}$ determined at step $T_2$.

It should be noted that it could be interesting to follow the change over time of the value $C_{mes}$.

The aforementioned steps $T_1$ to $T_3$ consist more precisely of comparing the frequency Fi–1 of the internal clock of the node Ni–1 transmitted to the node Ni with the frequency Fi of the internal clock of the node Ni during a cycle period Ti–1.

When the step $T_3$ results in equality, this means that no deviation is detected between the internal clocks of the nodes Ni–1 and Ni and that there is therefore no problem of synchronisation between these nodes.

In this case the step $T_3$ is followed by a new step $T_1$.

On the other hand, when the values $C_{ref}$ and $C_{mes}$ are not equal, the step $T_3$ is followed by the step $T_4$, and this means that a deviation has been detected between the nodes Ni–1 and Ni.

Thus the synchronisation check method according to the invention therefore makes it possible to effect a check in order to determine whether the nodes under consideration are synchronised with each other.

It should be noted that this method makes provision for checking the synchronisation by pairs of nodes and that in this way it can be transmitted along the whole of the communication network depicted in FIG. 2.

The step $T_4$ consists of determining whether the value $C_{refmax}$ is greater than the value $C_{mes}$.

In the affirmative, this means that the reference period or cycle Ti is too short compared with the reference period or cycle time Ti−1 and that the formula should therefore be extended.

The value $C_{mes}$ will in practice be equal to the value $C_{refmax}+1$.

It should be noted that the values $C_{mes}$ and $C_{ref}$ are then reinitialised to the value zero.

In practice, if the values $C_{ref}$ and $C_{mes}$ are different, then the difference which is a function of the precision of the clocks should be no higher than ±1.

It should however be noted that this difference may be extended to ±n.

With regard to the comparison of the registers, the value $C_{ref}$ should in theory be replaced by the value $C_{init\ (i)}$ so as to take account of any high deviation in value which would be assessed during the initialisation procedure.

This change in the duration Ti of the cycle peculiar to the node Ni is made by modifying the number of clock pulses generated by the internal clock of Ni and which are contained in the duration of the cycle or reference period Ti.

As depicted in FIG. 7, the method according to the invention also includes a step of transmission from the node Ni to the node Ni+1 indicating to the latter that the value Ti of the cycle of the node Ni has been modified by adding a clock pulse.

The command under consideration is written CmdMsg(+1).

On the other hand, when the value $C_{ref}$ is less than the value $C_{mes}$ then the step $T_4$ is followed by a step $T_8$ during which the duration of the cycle Ti is shortened since it is too long compared with the duration of the cycle Ti−1.

This modification is made by reducing the number of clock pulses during the period Ti.

In practice, the value $C_{mes}$ will be equal to $C_{remax}-1$.

It should be noted that the values $C_{mes}$ and $C_{ref}$ are then reset to zero.

In accordance with this step $T_6$, the method according to the invention also makes provision for transmitting, to the node Ni+1, a command denoted CmdMsg(−1) indicating to the node Ni+1 that the duration Ti of the cycle of the node Ni has been shortened.

As a variant, it would however be possible, after having performed steps $T_1$ to $T_4$ of the method described with reference to FIG. 6, to wait before performing a corrective action with a view to synchronising the nodes Ni−1 and Ni and to perform the previous steps once again.

It must however be noted that the deviation detected during this first execution of the steps $T_1$ to $T_4$ must be stored in the node Ni so as not to lose any information.

During a new execution of steps $T_1$ to $T_4$, a new deviation may thus be detected and for example be totalled with the previously detected deviation. It is then possible to choose either to effect a correction according to this cumulative deviation or to perform steps $T_1$ to $T_4$ once again in order to delay any corrective action.

According to the position of the node in the communication network 10 depicted in FIG. 2, it may be advantageous to delay the corrective action in order for example to avoid undertaking corrections which would be contrary with respect to each other.

Thus, over time, the time-delay action enables some of these deviations to compensate for each other and therefore to avoid thereby certain corrective actions.

This is all the more true if the node under consideration is situated close to a leaf in the tree FIG. 8 is an algorithm of the synchronisation checking method according to the invention implemented at the node Ni+1.

This algorithm is that of a computer program which is stored in a permanent storage means of the node Ni+1.

The method according to the invention includes a test step $T_7$ in order to determine whether the node Ni−1 has received a command CmdMsg(val) coming from the node Ni.

In the negative, the method makes provision for awaiting such a command.

In the affirmative, the step $T_7$ is followed by a step $T_8$ during which the value $C_{refmax}$ at the node Ni+1 goes to the value $C_{refmax+}+(\text{val})$.

It will be noted that the value "val" corresponds to more or less one clock pulse which is determined during the steps $T_5$ and $T_6$ of the algorithm of FIG. 7.

Thus, during the step $T_8$, an adjustment is carried out to the duration of the cycle Ti+1 by modifying the number of clock pulses contained within this period.

During the step $T_7$, the value CorrectC$_{refmax}$ is set to the value "val".

It will be noted that, during step $T_2$ of FIG. 7, when the value CorrectC$_{refmax}$ is different from zero, then the value $C_{refmax}$ is adjusted according to the value CorrectC$_{refmax}$.

The role of the value CorrectC$_{refmax}$ is to determine whether a correction has been made during the previous measuring period.

If such is the case, then the previous value of $C_{refmax}$ is returned to, given that the correction is made only for one measuring period.

By way of variant, it is possible for the correction to be made on several consecutive measuring periods.

The modifications which have just been described here will be taken into account during the next measurement at this node Ni+1.

The detection of a deviation at the node Ni+1 during the next measurement will cause the transmission of a command to the lower-level nodes.

According to a variant of FIG. 8 which is illustrated in FIG. 9, the method according to the invention includes a test step $T_7'$ on reception of a command coming from the node Ni similar to the step $T_7$ of FIG. 8.

When reception of such a command has indeed taken place, then the step $T_7'$ is followed by the step $T_8'$ during which the value $C_{ref}$ is increased by the value "val" which, it will be recalled, can be equal to ±1.

By way of variant, this value may be equal to ±n.

In the context of the variant described with reference to FIG. 9, the modification at the node Ni+1 consists, not as stated with reference to FIG. 8, of effecting a modification which will be taken into account only during the next measurement, but of modifying the value $C_{ref}$ represented by the number of clock pulses emitted by the internal clock of the node Ni and reconstituted at the node Ni+1 whilst the algorithm depicted in FIG. 7 is implemented at the node Ni+1.

Thus the current measurement is disturbed by the propagation of this modification coming from the node Ni and, following the performance of steps $T_1$ to $T_4$ executed at the node Ni+1, the comparison of the values $C_{ref}$ and $C_{mes}$ will make it possible to determine whether it is necessary to propagate this command to other lower nodes in the tree.

FIG. 10 illustrates another variant embodiment of the algorithm depicted in FIG. 8.

This algorithm includes a step $T_7''$ identical to the previous steps $T_7$ and $T_7'$.

The step $T_7''$ is followed by a step $T_8''$ during which the value $C_{ref}$ is incremented by the value "val"(±1) and the value $C_{mes}$ is also incremented by the same value.

The step $T_8''$ also includes a step of transmitting a command CmdMgs(val) to the nodes Ni+2 and Ni+3 of FIG. 2.

This corresponds to a propagation of the command indicating a modification of the duration of the cycle Ti of the node Ni.

This variant makes it possible to take into account immediately the modification to the duration of the cycle Ti of the node Ni without interfering with the current measurement.

What is claimed is:

1. A method of checking the synchronization between at least two nodes Ni−1 and Ni in a network, each of the nodes having an internal clock having respective clock frequencies Fi−1 and Fi, and defining time cycles having respective durations of $Ti-1=C_{init(i-1)}/Fi-1$ and $Ti=C_{init(i)}/Fi$, where $C_{init(i-1)}$ and $C_{init(i)}$ each define a number of clock pulses, said method comprising the following steps:

transmitting the frequency Fi−1 of the internal clock from node Ni−1 to node Ni, wherein transmission is effected by transmitting pulses generated by the internal clock of node Ni−1 to node Ni;

determining a number of clock pulses $C_{mes}$ generated at the frequency Fi which are contained in the time cycle Ti−1 defined using the received frequency Fi−1 and the number of clock pulses $C_{init(i-1)}$;

comparing the determined number of clock pulses $C_{mes}$ of clock pulses with the number of clock pulses $C_{init(i)}$; and checking the synchronization between nodes Ni−1 and Ni using the result of the comparison between the determined number of clock pulses $C_{mes}$ and the number of clock pulses $C_{init(i)}$.

2. A method according to claim 1, wherein said method further comprises modifying the time cycle duration Ti peculiar to node Ni according to the result of the comparison between the determined number of clock pulses $C_{mes}$ and the number of clock pulses $C_{init(i)}$.

3. A method according to claim 2, wherein modifying the time cycle duration Ti in said modification step is effected by making the number of clock pulses $C_{init}$ contained in the time cycle duration Ti equal to the determined number of clock pulses $C_{mes}$.

4. A method according to claim 2, wherein checking the synchronization is further performed between the node Ni and a node Ni+1, said method further comprising transmitting to the node Ni+1 a command indicating that the time cycle duration Ti of node Ni has been modified.

5. A method according to claim 1, wherein immediately after performing said transmission step, said determination step, said comparison step, and said checking step, these steps are re-executed at least one more time.

6. A method according to claim 1, wherein the network is a data packet switching network.

7. A method according to claim 1, wherein the network is a network of the type in accordance with IEEE 1355.

8. A device for checking the synchronization between at least two nodes Ni−1 and Ni in a network, each of the nodes having an internal clock having respective clock frequencies Fi−1 and Fi, and defining time cycles having respective durations of $Ti-1=C_{init(i-1)}/Fi-1$ and $Ti=C_{init(i)}/Fi$, where $C_{init(i-1)}$ and $C_{init(i)}$ each define a number of clock pulses, said device comprising:

means for receiving at node Ni the frequency Fi−1 of the internal clock from node Ni−1 by receiving pulses generated by the internal clock of node Ni−1 at node Ni;

means for determining a number of clock pulses $C_{mes}$ generated at the frequency Fi which are contained in the time cycle Ti−1 defined using the received frequency Fi−1 and the number of clock pulses $C_{init(i-1)}$;

means for comparing the determined number of clock pulses $C_{mes}$ with the number of clock pulses $C_{init(i)}$; and means for checking synchronization between nodes Ni−1 and Ni using the result of the comparison between the determined number of clock pulses $C_{mes}$ and the number of clock pulses $C_{init(i)}$.

9. A device according to claim 8, further comprising means for modifying the time cycle duration Ti peculiar to node Ni according to the result of the comparison between the determined number of clock pulses $C_{mes}$ and the number of clock pulses $C_{init(i)}$.

10. A device according to claim 9, wherein said means for modifying the time cycle duration Ti is adapted to make the number of clock pulses $C_{init}$ contained in the time cycle duration Ti equal to the determined number of clock pulses $C_{mes}$.

11. A device according to claim 10, wherein checking the synchronization is further performed between the node Ni and a node Ni+1, said device further comprising means for transmitting to the node Ni+1 a command indicating that the time cycle duration Ti of node Ni has been modified.

12. A device according to one of claim 8, wherein the network is a data packet switching network.

13. A device according to claim 8, wherein the network is a network of the type in accordance with IEEE 1355 standard.

14. A device according to claim 8, wherein immediately after said receiving means executes said receiving function, said determining means executes said determining function, said comparison means executes said comparison function, and said checking means performs said check function, these functions are re-executed at least one more time.

15. A program for executing a method of checking the synchronization between at least two nodes Ni−1 and Ni in a network, each of the nodes having an internal clock having a respective clock frequency Fi−1 and Fi, and defining time cycles having respective durations of $Ti-1=C_{init(i-1)}/Fi-1$ and $Ti=C_{init(i)}/Fi$, where $C_{init(i-1)}$ and $C_{init(i)}$ each define a number of clock pulses, said program comprising:

code for a transmission step, of transmitting the frequency Fi−1 of the internal clock from node Ni−1 to node Ni, wherein transmission is effected by transmitting pulses generated by the internal clock of node Ni−1 to node Ni;

code for determining the number of clock pulses $C_{mes}$ generated at frequency Fi which are contained in the time cycle Ti−1 defined using the received frequency Fi−1 and the number of clock pulses $C_{init(i-1)}$;

code for a comparison step, of comparing the determined number clock pulses $C_{mes}$ with the number of clock pulses $C_{init(i-1)}$; and code for a check step, of checking the synchronization between nodes Ni−1 and Ni using the result of the comparison between the frequencies Fi−1 and Fi.

16. A method of checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference clock pulses, said method comprising the steps of:

transmitting the frequency Fi from node Ni to node Ni+1;

transmitting a deviation of the clock frequency Fi over the reference period to node Ni+1;

determining the number of clock pulses contained in the reference period if generated at the frequency Fi+1 based on the frequency Fi and the deviation transmitted from node Ni;

comparing the number of clock pulses determined in said determining step with the predetermined number of clock pulses; and checking the synchronization between the node Ni+1 and the node having the reference clock in the network based on the result of said comparison step.

17. The method according to claim 16, wherein the deviation of the clock frequency Fi over the reference period is determined by calculating the difference between the number of clock pulses contained in the reference period when generated at the frequency Fi and the predetermined number of clock pulses.

18. The method according to claim 17 wherein the number of clock pulses contained in the reference period if generated at the frequency Fi+1 is determined by counting the number of clock pulses generated at the frequency Fi+1 during a period equal to that necessary for the generation of the predetermined number of clock pulses including the deviation at the frequency Fi.

19. A method of checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference clock pulses, said method comprising the steps of:

transmitting the frequency Fi from node Ni to node Ni+1;

transmitting the number of clock pulses counted during the reference period when generated at the frequency Fi from node Ni to node Ni+1;

determining the number of clock pulses contained in the reference period if generated at the frequency Fi+1 by counting the number of clock pulses generated at the frequency Fi+1 during a period equal to that necessary for the generation of the counted number of pulses received in the transmitting step from node Ni at the frequency Fi;

comparing the number of clock pulses determined in said determining step with the predetermined number of clock pulses; and checking the synchronization between the node Ni+1 and the node having the reference clock in the network based on the result of said comparison step.

20. A device for checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference clock pulses, said device comprising:

means for transmitting the frequency Fi from node Ni to node Ni+1;

means for transmitting a deviation of the clock frequency Fi over the reference period to node Ni+1;

means for determining the number of clock pulses contained in the reference period if generated at the frequency Fi+1 based on the frequency Fi and the deviation transmitted from node Ni;

means for comparing the number of clock pulses determined by said determination means with the predetermined number of clock pulses; and means for checking the synchronization between the node Ni+1 and the node having the reference clock in the network based on the result provided by said comparison means.

21. The device according to claim 20, wherein the deviation of the clock frequency Fi over the reference period is determined by calculating the difference between the number of clock pulses contained in the reference period when generated at the frequency Fi and the predetermined number of clock pulses.

22. The device according to claim 21, wherein the number of clock pulses contained in the reference period if generated at the frequency Fi+1 is determined by counting the number of clock pulses generated at the frequency Fi+1 during a period equal to that necessary for the generation of the predetermined number of clock pulses including the deviation at the frequency Fi.

23. A device for checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference clock pulses, said device comprising:

means for transmitting the frequency Fi from node Ni to node Ni+1;

means for transmitting the number of clock pulses counted during the reference period when generated at the frequency Fi from node Ni to node Ni+1;

means for determining the number of clock pulses contained in the reference period if generated at the frequency Fi+1 by counting the number of clock pulses generated at the frequency Fi+1 during a period equal to that necessary for the generation of the counted number of pulses received during the transmission from node Ni at the frequency Fi;

means for comparing the number of clock pulses determined by said determination means with the predetermined number of clock pulses; and means for checking the synchronization between the node Ni+1 and the node having the reference clock in the network based on the result provided by said comparison means.

24. A computer program for checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference clock pulses, said computer program comprising:

code for transmitting the frequency Fi from node Ni to node Ni+1;

code for transmitting a deviation of the clock frequency Fi over the reference period to node Ni+1;

code for determining the number of clock pulses contained in the reference period if generated at the frequency Fi+1 based on the frequency Fi and the deviation transmitted from node Ni;

code for comparing the number of clock pulses determined by said determination code with the predetermined number of clock pulses; and code for checking the synchronization between the node Ni+1 and the node having the reference clock in the network based on the result of said comparison code.

25. The computer program according to claim 24, wherein the deviation of the clock frequency Fi over the reference period is determined by calculating the difference between the number of clock pulses contained in the reference period when generated at the frequency Fi and the predetermined number of clock pulses.

26. The computer program according to claim 25, wherein the number of clock pulses contained in the reference period if generated at the frequency Fi+1 is determined by counting the number of clock pulses generated at the frequency Fi+1 during a period equal to that necessary for the generation of the predetermined number of clock pulses including the deviation at the frequency Fi.

27. A computer program for checking the synchronization between a node Ni and a node Ni+1 in a network having a plurality of nodes, each node having an internal clock, the nodes Ni and Ni+1 having respective clock frequencies Fi and Fi+1, one node in the network having a reference clock and defining a reference period containing a predetermined number of reference dock pulses, said computer program comprising:

code for transmitting the frequency Fi from node Ni to node Ni+1;

code for transmitting the number of clock pulses counted during the reference period when generated at the frequency Fi from node Ni to node Ni+1;

code for determining the number of clock pulses contained in the reference period if generated at the frequency Fi+1 by counting the number of clock pulses generated at the frequency Fi+1 during a period equal to that necessary for the generation of the counted number of pulses received during the transmission from node Ni at the frequency Fi;

code for comparing the number of clock pulses determined by said determination code with the predetermined number of clock pulses; and code for checking the synchronization between the node Ni+1 and clock in the network based on the result provided by said comparison code.

* * * * *

UNITED STATES PATENT AND TRADEMARK OFFICE
CERTIFICATE OF CORRECTION

PATENT NO. : 6,880,097 B1
DATED : April 12, 2005
INVENTOR(S) : Laurent Frouin et al.

It is certified that error appears in the above-identified patent and that said Letters Patent is hereby corrected as shown below:

Column 2,
Line 47, "said node Ni" should read -- said node $N_i$, --.

Column 4,
Line 1, "fist" should read -- first --.

Column 6,
Line 12, "125 is" should read -- 125 µs --.

Column 7,
Line 39, "$C_{refnit}$" should read -- $C_{refinit}$ --.

Column 12,
Line 2, "FIG. 8" should begin a new paragraph.
Line 21, "$T_7$" should read -- $T_8$ --.

Column 15,
Line 19, "claim 17" should read -- claim 17, --.

Column 18,
Line 18, "and clock" should read -- and the node having the reference clock --.

Signed and Sealed this

Twenty-first Day of March, 2006

JON W. DUDAS
*Director of the United States Patent and Trademark Office*